United States Patent
Shen et al.

(10) Patent No.: US 12,044,595 B2
(45) Date of Patent: Jul. 23, 2024

(54) DYNAMIC JOINT DISTRIBUTION ALIGNMENT NETWORK-BASED BEARING FAULT DIAGNOSIS METHOD UNDER VARIABLE WORKING CONDITIONS

(71) Applicant: SOOCHOW UNIVERSITY, Suzhou (CN)

(72) Inventors: Changqing Shen, Suzhou (CN); Shuangjie Liu, Suzhou (CN); Xu Wang, Suzhou (CN); Dong Wang, Suzhou (CN); Yongjun Shen, Suzhou (CN); Zaigang Chen, Suzhou (CN); Aiwen Zhang, Suzhou (CN); Xingxing Jiang, Suzhou (CN); Juanjuan Shi, Suzhou (CN); Weiguo Huang, Suzhou (CN); Jun Wang, Suzhou (CN); Guifu Du, Suzhou (CN); Zhongkui Zhu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 372 days.

(21) Appl. No.: 17/763,494

(22) PCT Filed: Jan. 13, 2021

(86) PCT No.: PCT/CN2021/071615
§ 371 (c)(1),
(2) Date: Mar. 24, 2022

(87) PCT Pub. No.: WO2022/141669
PCT Pub. Date: Jul. 7, 2022

(65) Prior Publication Data
US 2023/0168150 A1    Jun. 1, 2023

(30) Foreign Application Priority Data

Dec. 31, 2020  (CN) .......................... 202011632478.8

(51) Int. Cl.
*G06F 11/22* (2006.01)
*G01M 13/045* (2019.01)
(Continued)

(52) U.S. Cl.
CPC ....... *G01M 13/045* (2013.01); *G06F 11/2263* (2013.01); *G06N 3/0464* (2023.01); *G06N 3/08* (2013.01)

(58) Field of Classification Search
CPC .............................. G06F 11/2263; G06N 3/08
See application file for complete search history.

(56) References Cited

U.S. PATENT DOCUMENTS

2021/0012232 A1*  1/2021  Lei ........................... G06N 3/08

FOREIGN PATENT DOCUMENTS

| CN | 109711413 A | 5/2019 |
| CN | 109947086 A | 6/2019 |

(Continued)

OTHER PUBLICATIONS

Shufa Han et al. "Measurement of weld pool oscillation for pulsed GTAW based on laser vision" Microcomputer Applications vol. 35. No. 1, 2019, pp. 4-9 (Jan. 31, 2019).

(Continued)

*Primary Examiner* — Jigar P Patel
(74) *Attorney, Agent, or Firm* — SZDC Law PC

(57) ABSTRACT

The present invention provides a dynamic joint distribution alignment network-based bearing fault diagnosis method under variable working conditions, including acquiring bearing vibration data under different working conditions to obtain a source domain sample and a target domain sample; establishing a deep convolutional neural network model with dynamic joint distribution alignment; feeding both the source domain sample and the target domain sample into the deep convolutional neural network model with initialized (Continued)

parameters, and extracting, by a feature extractor, high-level features of the source domain sample and the target domain sample; calculating a marginal distribution distance and a conditional distribution distance; obtaining a joint distribution distance according to the marginal distribution distance and the conditional distribution distance, and combining the joint distribution distance and a label loss to obtain a target function; and optimizing the target function by using SGD, and training the deep convolutional neural network model.

10 Claims, 4 Drawing Sheets

(51) Int. Cl.
*G06N 3/0464* (2023.01)
*G06N 3/08* (2023.01)

(56) References Cited

FOREIGN PATENT DOCUMENTS

| CN | 110849627 A | 2/2020 |
| CN | 110866365 A | 3/2020 |
| CN | 111442926 A | 7/2020 |
| CN | 111444859 A | 7/2020 |
| CN | 111651937 A | 9/2020 |
| CN | 111829782 A | 10/2020 |
| DE | 10220124 A1 | 11/2003 |

OTHER PUBLICATIONS

Hongliang Yan et al. "Mind the Class Weight Bias: Weighted Maximum Mean Discrepancy for Unsupervised Domain Adaptation" 2017 IEEE Conference on Computer Vision and Pattern Recognition (CVPR), pp. 945-954 (Nov. 9, 2017).

* cited by examiner

DYNAMIC JOINT DISTRIBUTION ALIGNMENT NETWORK-BASED BEARING FAULT DIAGNOSIS METHOD UNDER VARIABLE WORKING CONDITIONS

This application is the National Stage Application of PCT/CN2021/071615, filed on Jan. 13, 2021, which claims priority to Chinese Patent Application No. 202011632478.8, filed on Dec. 31, 2020, which is incorporated by reference for all purposes as if fully set forth herein.

FIELD OF THE INVENTION

The present invention relates to the fields of mechanical fault diagnosis and computer artificial intelligence (AI), and more particularly to a dynamic joint distribution alignment network-based bearing fault diagnosis method under variable working conditions.

DESCRIPTION OF THE RELATED ART

In recent years, the development of industry has become more and more demanding for long, safe, and reliable operation of machinery and equipment. To avoid major economic losses and personal injuries, the development and application of fault diagnosis technologies have become an important means to improve the safety and stability of mechanical systems. In the fault diagnosis technologies, the operating status of equipment is monitored to determine the location of a fault and identify a potential safety hazard in time. Therefore, to prevent catastrophic accidents, it is especially important to strengthen the status monitoring of machinery and equipment to accurately identify a fault in time. As one of the key components of rotating machinery, the health status of rolling bearings directly affects the stability of the whole rotating machinery. However, at the same time, rolling bearings are in high temperature, heavy load, high speed, and other harsh working conditions for a long time and are prone to wear, cracking, fracture, and other failures, seriously endangering the safe operation of the entire rotating system. Therefore, the study of status information of rolling bearings and corresponding fault diagnosis technologies is of positive and great significance to ensure safe and reliable operation of machinery and equipment, thereby improving production efficiency, and protecting personal safety.

Numerous studies have shown that bearing vibration data is an effective basis for fault diagnosis. Conventional fault diagnosis methods include extraction of fault characteristic frequencies based on vibration signals, short-time Fourier transform, empirical mode decomposition, a sparse representation method, and the like. These conventional fault diagnosis methods usually rely on particular a priori knowledge, require specialized signal processing techniques and manual extraction of appropriate features, and are not applicable to processing of massive vibration data. In response to the shortcomings of the conventional fault diagnosis methods, deep learning methods are widely applied to the field of fault diagnosis. An AI-based fault diagnosis framework generally includes four stages: data acquisition, model establishment, model training, and model validation. A deep learning-based fault diagnosis method can automatically extract features and accelerate computation to meet the demand of processing massive information in the context of big data era. In addition, a deep learning model does not require manual extraction of features. A deep learning model can automatically learn features without requiring extensive a priori knowledge. The development of computer technologies has also driven the rapid development of deep learning-based fault diagnosis techniques.

Conventional fault diagnosis techniques assume that test data obeys the same distribution as training data and have achieved outstanding results. However, this assumption is hardly valid in actual industrial applications. In one aspect, because rotating machinery is often in an operating environment with complex rotational speed and load, historical data used for training models obeys a different distribution from real-time data acquired during actual monitoring of equipment status, resulting in poor universality and generality of models based on conventional depth methods. In another aspect, in actual applications, it is not possible to obtain enough vibration data for each equipment status under all working conditions to train specific models to meet diagnostic requirements.

SUMMARY OF THE INVENTION

A technical problem to be resolved by the present invention is to provide a dynamic joint distribution alignment network-based bearing fault diagnosis method under variable working conditions The method can reduce the impact of a domain shift, so that a deep learning model can adequately complete fault diagnosis tasks under variable working conditions, the speed is fast, and the operation amount is small.

To resolve the foregoing technical problems, the present invention provides a dynamic joint distribution alignment network-based bearing fault diagnosis method under variable working conditions, including the following steps:

S1: acquiring bearing vibration data under different working conditions to obtain a source domain sample and a target domain sample, where a bearing has different health states under each working condition, bearing vibration data in different health states under each working condition is used as a data domain, and the source domain sample and the target domain sample are selected from the data domain; and the source domain sample is attached with a label, and the label corresponds to a fault type and a fault size;

S2: establishing a deep convolutional neural network model with dynamic joint distribution alignment, where the deep convolutional neural network model includes a feature extractor and a classifier; and modifying the last layer of neurons of the classifier, to enable a quantity of the last layer of neurons of the classifier to be equal to a quantity of types of labels;

S3: feeding both the source domain sample and the target domain sample into the deep convolutional neural network model with initialized parameters, and extracting, by the feature extractor, high-level features of the source domain sample and the target domain sample;

processing, by the classifier, the high-level features, to generate a predicted label of the source domain sample and a soft pseudo label of the target domain sample, and calculating a label loss between the predicted label of the source domain sample outputted by the classifier and an actual label of the source domain sample; and processing the high-level features of the source domain sample and the target domain sample by using maximum mean discrepancy (MMD) to obtain a marginal distribution distance between the source domain sample and the target domain sample, and processing the high-level features of the source domain sample and the target domain sample, the actual label of the source domain sample, and the soft pseudo label of the target domain sample by using weighted conditional MMD, to obtain a conditional distribution distance between the source domain sample and the target domain sample;

S4: obtaining a joint distribution distance according to the marginal distribution distance and the conditional distribution distance, and combining the joint distribution distance and the label loss to obtain a target function;

S5: optimizing the target function by using stochastic gradient descent (SGD), and training the deep convolutional neural network model to obtain an optimized deep convolutional neural network model; and S6: inputting the target domain sample into the optimized deep convolutional neural network model to obtain a predicted label of a target domain; and comparing the predicted label of the target domain with an actual label of the target domain to obtain diagnosis accuracy.

Preferably, S1 includes:

establishing data sets for different workloads, where each data set is named after a workload of the data set, data in different data sets obeys different distributions, and the data set is a source domain or a target domain; and segmenting samples by using N consecutive sampling points as one sample length to make the data set to obtain the source domain sample and the target domain sample;

where the source domain sample is $\mathcal{D}_s\{(x_i^s, y_i^s)\}_{i=1}^{n_s}$, $y_i^s \in \{1, 2, \ldots, C\}$ denotes a source domain formed by samples of C different labels, $x_i^s$ denotes an $i^{th}$ sample in the source domain, $y_i^s$ denotes a label of the $i^{th}$ sample in the source domain, and $n_s$ is a total quantity of samples in the source domain;

the target domain sample is $\mathcal{D}_t=\{(x_j^t)\}_{j=1}^{n_t}$, x denotes a $j^{th}$ sample in the target domain, and $n_t$ is a quantity of all samples in the target domain; data in the source domain is acquired under a probability distribution $P_s$, data in the target domain is acquired under a probability distribution $P_t$, and $P_s \neq P_t$; and the data in the source domain and the data in the target domain obey different distributions.

Preferably, S2 includes:

modifying the structure of ResNet-50 of the deep convolutional neural network model, and modifying a quantity of neurons outputted by the last fully connected layer to be equal to a total quantity of labels.

Preferably, between S2 and S3, the method further includes:

performing fast Fourier transform (FFT) on the source domain sample in a time domain sample to obtain a source domain sample in a frequency domain.

Preferably, the classifier in S2 is a softmax classifier.

Preferably, the processing the high-level features of the source domain sample and the target domain sample by using MMD to obtain a marginal distribution distance between the source domain sample and the target domain sample in in S3 specifically includes:

the marginal distribution distance:

$$MMD(X^s, X^t) = \left\| \frac{1}{n_s}\sum_{i=1}^{n_s}\Phi(x_i^s) - \frac{1}{n_t}\sum_{j=1}^{n_t}\Phi(x_j^t) \right\|_H^2$$

$$= \frac{1}{n_s^2}\sum_{i=1}^{n_s}\sum_{j=1}^{n_s}K(x_i^s, x_j^s) + \frac{1}{n_t^2}\sum_{i=1}^{n_t}\sum_{j=1}^{n_t}K(x_i^t, x_j^2) -$$

$$\frac{2}{n_s n_t}\sum_{i=1}^{n_s}\sum_{j=1}^{n_t}K(x_i^s, x_j^t),$$

where H denotes the reproducing kernel Hilbert space, and $\Phi(\bullet)$ denotes a function to which a feature space is mapped; and $K(\bullet,\bullet)$ denotes the Gaussian kernel function, and a formula of the Gaussian kernel function is as follows:

$$K(x_i, x_j) = e^{-\frac{\|x_i - x_j\|^2}{2\sigma^2}},$$

where σ is a bandwidth, $x_i^s$ denotes an $i^{th}$ sample in the source domain, and $x_j^t$ denotes a $j^{th}$ sample in the target domain.

Preferably, the processing the high-level features of the source domain sample and the target domain sample, the actual label of the source domain sample, and the soft pseudo label of the target domain sample by using weighted conditional MMD, to obtain a conditional distribution distance between the source domain sample and the target domain sample in S3 specifically includes:

a weighted conditional distribution distance:

$$WCMMD(X^s, X^t) = \frac{1}{C}\sum_{c=1}^{C}\left\|\sum_{i=1}^{n_s^c}w_i^{sc}\Phi(x_i^{sc}) - \frac{1}{n_t^c}\sum_{j=1}^{n_t^c}w_j^{tc}\Phi(x_j^{tc})\right\|_H^2$$

$$= \frac{1}{C}\sum_{c=1}^{C}\left[\sum_{i=1}^{n_s^c}\sum_{j=1}^{n_s^c}w_i^{sc}w_j^{sc}K(x_i^{sc}, x_j^{sc}) + \sum_{i=1}^{n_t^c}\sum_{j=1}^{n_t^c}w_i^{tc}w_j^{tc}K(x_i^{tc}, x_j^{tc}) - \right.$$

$$\left. 2\sum_{i=1}^{n_s^c}\sum_{j=1}^{n_t^c}w_i^{sc}w_j^{tc}K(x_i^{sc}, x_j^{tc})\right],$$

where $w_i^{sc}$ and $w_i^{tc}$ denote weights of corresponding samples, and a calculation formula is as follows:

$$w_i^c = \frac{y_i^c}{\sum_{j=1}^{n}y_j^c},$$

where $y_i^c$ is a value at a $c^{th}$ position of a soft label $y_i$ corresponding to an $i^{th}$ sample $x_i$, $x_i^s$ denotes an $i^{th}$ sample in the source domain, and $x_j^t$ denotes a $j^{th}$ sample in the target domain;

for the source domain sample, $y_i$ is a one-hot vector of an actual label of the sample $x_i$; and for the target domain sample, $y_i$ is a probability distribution $\hat{y}_i = f(x_i)$ outputted by the classifier, the probability distribution outputted by the classifier is a vector formed by C elements, and each element denotes a probability that a sample belongs to a label.

Preferably, the calculating a label loss between the predicted label of the source domain sample outputted by the classifier and an actual label of the source domain sample in S3 specifically includes:

the label loss $$loss_{label}(Y_s, f(X_s)) = \frac{1}{n_s}\sum_{i=0}^{n_s}J(y_s, f(x_s)),$$

where J(•,•) denotes a cross-entropy loss function, and $$J(y_s, \hat{y}_s) = -\sum_{i=1}^{C} y_i \log(\hat{y}_i).$$

Preferably, S4 specifically includes:
setting a dynamic parameter $$\mu, \mu = \frac{MMD(X_s, X_t)}{MMD(X_s, X_t) + WCMMD(X_s, X_t)},$$

where $MMD(X_s, X_t)$ and $WCMMD(X_s, X_t)$ respectively denote the marginal distribution distance and the conditional distribution distance between the source domain sample and the target domain sample; and
the target function:

$$loss_{total} = \min_f J(Y_s, f(X_s)) + \lambda JDD(X_s, X_t)$$

$$= \min_f \frac{1}{n_s}\sum_{i=0}^{n_s} J(y_s, f(x_s)) + \lambda((1-\mu)MMD(X_s, X_t) + \mu WCMMD(X_s, X_t)),$$

where J(•,•) denotes a cross-entropy loss function, λ is a hyperparameter $$(\lambda > 0), \lambda = \frac{2}{1 + e^{\frac{-10*step}{steps}}} - 1,$$

steps is a total quantity of times of training, and step is a current training step number.

The present invention discloses a computer device, including: a memory, a processor, and a computer program stored in the memory and configured to be executed by the processor, where the processor is configured to execute the program to implement the steps in the foregoing method.

As compared with the prior art, the beneficial effects of the present invention are as follows:

1. In the present invention, to deal with complex and changing working conditions in actual industrial applications that lead to the decline of universality and generality of conventional neural network models, the knowledge of transfer learning is combined with deep learning. Searches are made for similarities between equipment health status signals under different working conditions. Useful knowledge obtained from historical training data is applied to real-time signals acquired by an online diagnostic system, thereby greatly improving the robustness of the model. In addition, with the help of computer hardware, the model can handle massive data, thereby effectively detecting the status of a large number of devices in real time, and improving operational efficiency.

2. In the present invention, high-level features of both training samples and test samples are extracted during training. The high-level features of the source domain sample and the target domain sample are processed by using MMD to obtain a marginal distribution distance between the source domain sample and the target domain sample. The high-level features of the source domain sample and the target domain sample, an actual label of the source domain sample, and a soft pseudo label of the target domain sample are processed by using weighted conditional MMD, to obtain a conditional distribution distance between the source domain sample and the target domain sample. A joint distribution distance is obtained according to the marginal distribution distance and the conditional distribution distance. The joint distribution distance is used as a part of a target function for backward propagation to implement adaptiveness and reduce the impact of a domain drift, so that a deep learning model can better complete fault diagnosis tasks under variable working conditions.

3. In the present invention, the uncertainty and probability of a deep learning model are fully takes into consideration. A hard label of model prediction is replaced with a soft pseudo label in weighted conditional MMD, thereby improving computational efficiency of conditional distributions, so that more accurate matching can be implemented. A dynamic adjustment factor is proposed to combine the marginal distribution distance and the conditional distribution distance, so that the relative importance of the marginal distribution distance and the conditional distribution distance in dealing with a domain drift problem can be quantitatively compared, thereby helping to reduce distribution differences, and it is very easy to embed the present invention in most deep learning model frameworks to handle cross-domain learning problems.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

The present invention is described below in detail with reference to actual experimental data.

The experimental data is a bearing data set made in a laboratory. A data acquisition system is formed by a drive motor, a bolt and nut loading system, a healthy bearing, a test bearing, a vibration acceleration sensor connected to a computer, and other major components. An accelerometer acquires vibration data, and a sampling frequency is 10 kHz. Faults are introduced into a roller, an inner ring, and an outer ring by using an electrical discharge machining (EDM) technique, and different fault sizes are set.

Figure 1:
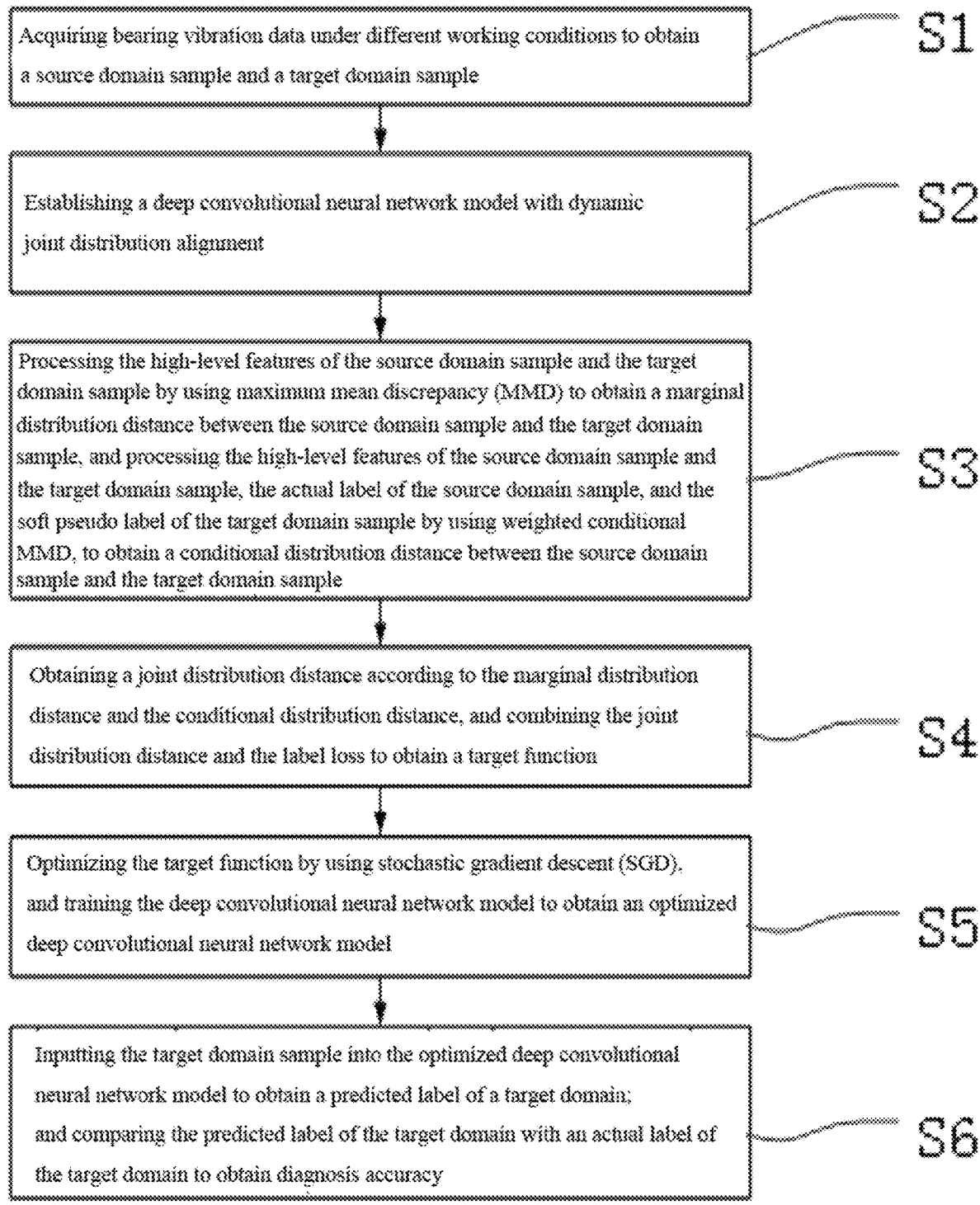
FIG. 1 is a diagram illustrating steps of a rolling bearing fault diagnosis method based on a convolutional neural network and transfer learning under variable working conditions according to the present invention.
Figure 2:
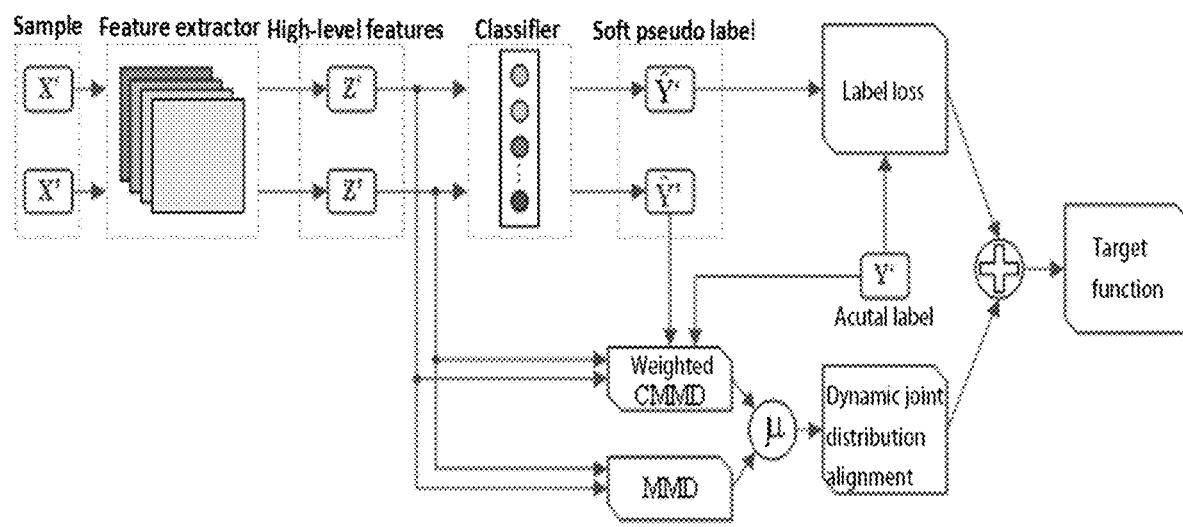
FIG. 2 is a structural diagram of a dynamic distribution alignment network model according to the present invention.
Figure 3:
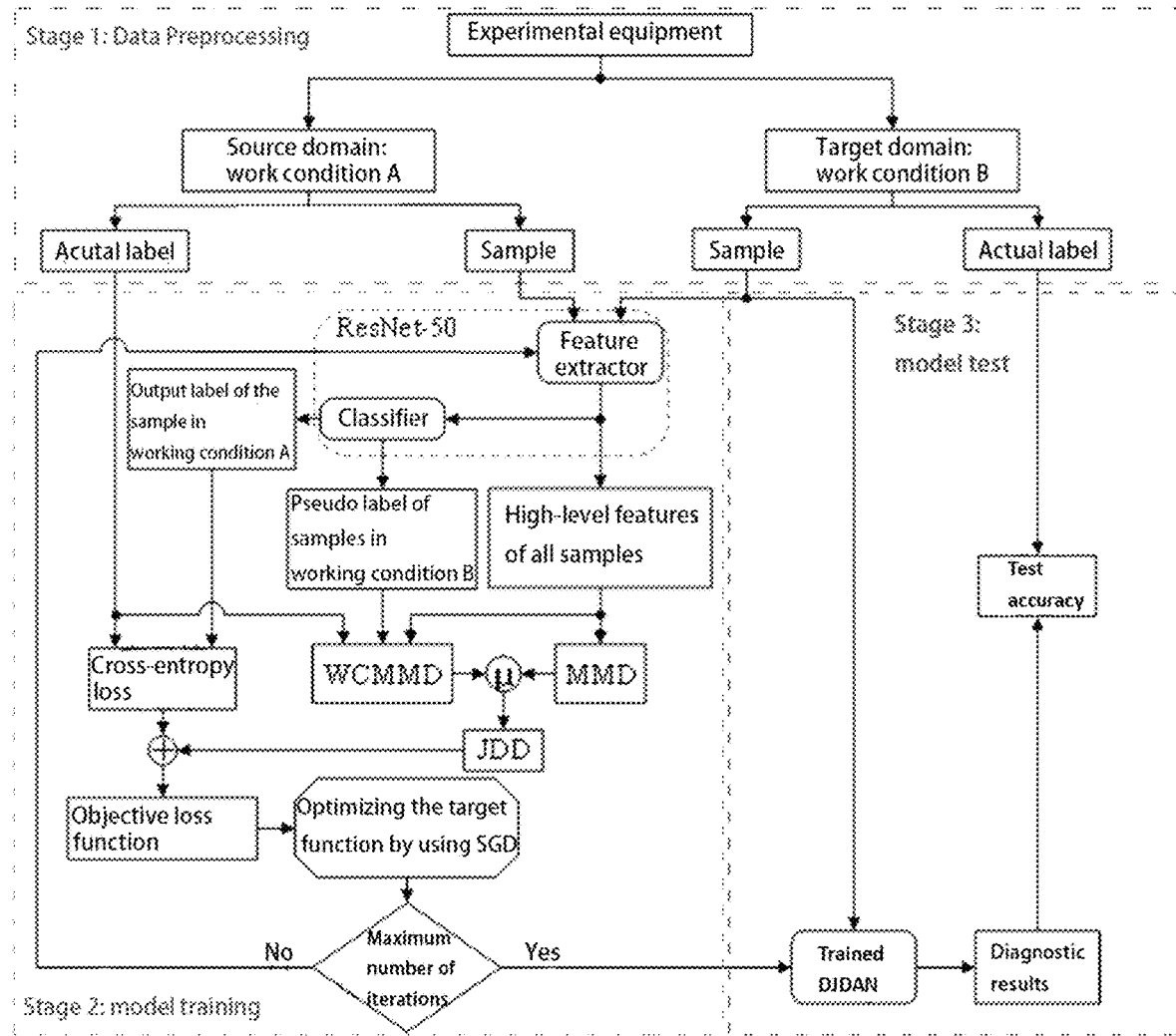
FIG. 3 is a flowchart of a diagnosis method according to the present invention.

As shown in FIG. 1 to FIG. 3, the present invention includes the following steps.

Step 1: acquiring bearing vibration data under different working conditions to obtain a source domain sample and a target domain sample, where a bearing has different health states under each working condition, bearing vibration data in different health states under each working condition is used as a data domain, and the source domain sample and the target domain sample are selected from the data domain; and the source domain sample is attached with a label, and the label corresponds to a fault type and a fault size. Specifically, Step 1 includes the following steps.

Step 1.1: establishing data sets for different workloads (that is, different working conditions), where each data set is named after a workload of the data set, data in different data sets obeys different distributions, each data set includes a normal bearing state, an outer ring fault, an inner ring fault, and different fault sizes, and each data set is a source domain or a target domain.

Data sets (0 hp, 1 hp, 2 hp, and 3 hp) under four different working conditions, that is, variable loads, are established in this embodiment, to simulate transfer learning tasks of a rolling bearing under variable working conditions. These data sets are named after workloads of the data sets. For example, the data set 0 hp denotes that a sample comes from a vibration signal acquired under a workload 0 hp. Therefore, the four data sets of the variable loads denote four domains with different data distributions. Single-point faults are set for a roller, an inner ring, and an outer ring by using an EDM technique. Fault degrees are 0.2 millimeters and 0.3 millimeters.

Step 1.2: The source domain sample is $\mathcal{D}_s = \{(x_i^s, y_i^s)\}_{i=1}^{n_s}$, $y_i^s \in \{1, 2, \ldots, C\}$ denotes a source domain formed by samples of C different labels, $x_i^s$ denotes an $i^{th}$ sample in the source domain, $y_i^s$ denotes a label of the $i^{th}$ sample in the source domain, and $n_s$ is a total quantity of samples in the source domain; $\mathcal{D}_t = \{(x_j^t)\}_{j=1}^{n_t}$, $x_j^t$ denotes a target domain formed by samples without labels, $x_j^t$ denotes a $j^{th}$ sample in the target domain, and $n_t$ is a quantity of all samples in the target domain; and data in the source domain is acquired under a probability distribution $P_s$, data in the target domain is acquired under a probability distribution $P_t$, and $P_s \neq P_t$. Table 1 is detailed description of seven samples in each domain.

TABLE 1

| Fault size/mm | Status | Label | Sample quantity | Symbol representation |
|---|---|---|---|---|
| — | Normal | 1 | 200 | NO |
| 0.2 | Inner ring fault | 2 | 200 | IF2 |
| 0.2 | Ball fault | 3 | 200 | BF2 |
| 0.2 | Outer ring fault | 4 | 200 | OF2 |
| 0.3 | Inner ring fault | 5 | 200 | IF3 |
| 0.3 | Ball fault | 6 | 200 | BF3 |
| 0.3 | Outer ring fault | 7 | 200 | OF3 |

A diagnosis task across variable working conditions is denoted by a symbol A hp→B hp. A source domain is a data set A hp. All samples and labels of the samples participate in a training process. B hp denotes the target domain. Actual labels of samples in the target domain do not participate in training and are only used for testing in a validation process.

Step 2: establishing a deep convolutional neural network model with dynamic joint distribution alignment, where the deep convolutional neural network model includes a feature extractor and a classifier; and modifying the last layer of neurons of the classifier, to enable a quantity of the last layer of neurons of the classifier to be equal to a quantity of types of labels.

Specifically, Step 2 includes: modifying the structure of ResNet-50 of the deep convolutional neural network model, and modifying a quantity of neurons outputted by the last fully connected layer to be equal to a total quantity of labels. The classifier in S2 is a softmax classifier.

Between Step 2 and Step 3, the present invention further includes: performing FFT on the source domain sample in a time domain sample to obtain a source domain sample in a frequency domain. The step specifically includes:

performing FFT on samples with labels in the source domain and samples without labels in the target domain, and converting a time domain signal into a frequency domain signal, where a formula of FFT of a decimation in time algorithm is shown as follows:

$$X(k) = \sum_{n=0}^{N-1} x(n) W_n^{nk}, 0 \le k \le N-1, W_N = e^{-j\frac{2\pi}{N}} \quad (1)$$

$$\begin{cases} X(k) = X_1(k) + W_N^k X_2(k) \\ X\left(k + \frac{N}{2}\right) = X_1(k) - W_N^k X_2(k) \end{cases}, k = 0, 1, 2, \ldots, \frac{N}{2} - 1,$$

where $x(n)$ denotes a value of an $n^{th}$ sampling point in an original sample time sequence, and $X(k)$ denotes a $k^{th}$ value in a spectrogram.

Step 3: feeding both the source domain sample and the target domain sample into the deep convolutional neural network model with initialized parameters, and extracting, by the feature extractor, high-level features of the source domain sample and the target domain sample; processing the high-level features by using the classifier, to generate a predicted label of the source domain sample and a soft pseudo label of the target domain sample, and calculating a label loss between the predicted label of the source domain sample outputted by the classifier and an actual label of the source domain sample; and processing the high-level features of the source domain sample and the target domain sample by using MMD to obtain a marginal distribution distance between the source domain sample and the target domain sample, and processing the high-level features of the source domain sample and the target domain sample, the actual label of the source domain sample, and the soft pseudo label of the target domain sample by using weighted conditional MMD, to obtain a conditional distribution distance between the source domain sample and the target domain sample.

Specifically, a deep adaptive convolutional neural network model extracts deep-level features of samples by using improved ResNet-50. A process of the extraction is as follows:

$$g(x) = f(x) \quad (2),$$

where x denotes a frequency domain sample obtained after FFT, f( ) denotes modified ResNet-50, and g(x) denotes low-level features extracted from samples by using improved ResNet-50.

A high-level feature extracted by a deep-level feature extractor is used as an input of the softmax classifier. A softmax function is denoted as follows:

$$q_i = \frac{e^{V_i}}{\sum_{i=0}^{C-1} e^{V_i}}, \quad (3)$$

where $q_i$ denotes a probability that a sample belongs to a label i, C is a total quantity of types of labels, and vi is a value at an $i^{th}$ position inputted by the softmax function.

Step 3.3: separately calculating a marginal distribution distance and a conditional distribution distance between a high-level feature in the source domain and a high-level feature in the target domain. The marginal distribution distance is calculated by using MMD, and a formula of a Gaussian kernel function is as follows:

$$MMD(X^s, X^t) = \left\| \frac{1}{n_s}\sum_{i=1}^{n_s}\Phi(x_i^s) - \frac{1}{n_t}\sum_{j=1}^{n_t}\Phi(x_j^t) \right\|_H^2 = \quad (4)$$

$$\frac{1}{n_s^2}\sum_{i=1}^{n_s}\sum_{j=1}^{n_s}K(x_i^s, x_j^s) + \frac{1}{n_t^2}\sum_{i=1}^{n_t}\sum_{j=1}^{n_t}K(x_i^t, x_j^t) - \frac{2}{n_s n_t}\sum_{i=1}^{n_s}\sum_{j=1}^{n_t}K(x_i^s, x_j^t),$$

where H denotes a reproducing kernel Hilbert space, and $\Phi(\bullet)$ denotes a function to which a feature space is mapped; and $K(\bullet,\bullet)$ denotes the Gaussian kernel function, and a formula of the Gaussian kernel function is as follows:

$$K(x_i, x_j) = e^{-\frac{\|x_i - x_j\|^2}{2\sigma^2}}, \quad (5)$$

where σ is a bandwidth, and a marginal distance between the source domain and the target domain may be optimized by minimizing MMD.

Because a label of the target domain sample in a training process are unknown, it seems to be impossible to match a conditional distribution distance between the source domain and the target domain. A predetermined result of the target domain sample by a deep learning model in a training iteration process is used as a pseudo label to calculate the conditional distribution distance of the source domain and the target domain. A formula of the conditional distribution distance is introduced as follows:

$$CMMD(X^s, X^t) = \quad (6)$$

$$\frac{1}{C}\sum_{c=1}^{C}\left\| \frac{1}{n_s^c}\sum_{i=1}^{n_s^c}\Phi(x_i^{sc}) - \frac{1}{n_t^c}\sum_{j=1}^{n_t^c}\Phi(x_j^{tc}) \right\|_H^2 = \frac{1}{C}\sum_{c=1}^{C}\left[ \frac{1}{(n_s^c)^2}\sum_{i=1}^{n_s^c}\sum_{j=1}^{n_s^c}K(x_i^{sc}, x_j^{sc}) + \frac{1}{(n_t^c)^2}\sum_{i=1}^{n_t^c}\sum_{j=1}^{n_t^c}K(x_i^{tc}, x_j^{tc}) - \frac{2}{n_s^c n_t^c}\sum_{i=1}^{n_s^c}\sum_{j=1}^{n_t^c}K(x_i^{sc}, x_j^{tc}) \right],$$

where c denotes a $c^{th}$ label in C labels, and $\Phi(\bullet)$ denotes a function to which a feature space is mapped; $x_i^{sc}$ denotes an $i^{th}$ sample of samples with a label of c in the source domain, $n_s^c$ and $n_t^c$ respectively denote quantities of all samples with the label of c in the source domain and the target domain, and $x_j^{tc}$ denotes a $j^{th}$ sample of samples with the label of c in the source domain; the foregoing formula is used to estimate a difference between conditional distributions $P_s(x_s|y_s=c)$ and $P_t(x_t|y_t=c)$; and the difference between conditional distributions of the source domain and the target domain can be reduced by minimizing the foregoing formula.

However, because the foregoing model may give an incorrect hard label in a training process, and the incorrect hard label may cause negative transfer, a weighted conditional distribution distance is introduced, a formula is as follows:

$$WCMMD(X^s, X^t) = \frac{1}{C}\sum_{c=1}^{C}\left\| \sum_{i=1}^{n_s^c} w_i^{sc}\Phi(x_i^{sc}) - \frac{1}{n_t^c}\sum_{j=1}^{n_t^c} w_j^{tc}\Phi(x_j^{tc}) \right\|_H^2 = \quad (7)$$

$$\frac{1}{C}\sum_{c=1}^{C}\left[ \sum_{i=1}^{n_s^c}\sum_{j=1}^{n_s^c} w_i^{sc}w_j^{sc}K(x_i^{sc}, x_j^{sc}) + \sum_{i=1}^{n_t^c}\sum_{j=1}^{n_t^c} w_i^{tc}w_j^{tc}K(x_i^{tc}, x_j^{tc}) - 2\sum_{i=1}^{n_s^c}\sum_{j=1}^{n_t^c} w_i^{sc}w_j^{tc}K(x_i^{sc}, x_j^{tc}) \right]$$

where $w_i^{sc}$ and $w_i^{tc}$ denote weights of corresponding samples, and a calculation formula is as follows:

$$w_i^c = \frac{y_i^c}{\sum_{j=1}^{n} y_j^c}, \quad (8)$$

where $y_i^c$ is a value at a $c^{th}$ position of a soft label $y_i$ corresponding to an $i^{th}$ sample $x_i$; for the source domain sample, $y_i$ is a one-hot vector of an actual label of the sample $x_i$; and for the target domain sample, $y_i$ is a probability distribution outputted by softmax, that is, $\hat{y}_i=f(x_i)$, and is a vector formed by C elements, and each element denotes a probability that a sample belongs to a label.

Although a pseudo label rather than an actual label of the target domain sample is used in a training process, as the number of times of iteration increases, a training error becomes increasingly small, and the pseudo label keeps approximating to the real label, thereby implementing as accurate as possible classification of samples in the target domain.

A predicted label training error of the source domain sample is calculated. A process of the calculation is shown in the following formula:

$$loss_{label}(Y_s, f(X_s)) = \frac{1}{n_s}\sum_{i=0}^{n_s} J(y_s, f(x_s)), \quad (9)$$

where $J(\bullet,\bullet)$ denotes a cross-entropy loss function, which is defined as follows:

$$J(y_s, \hat{y}_s) = -\sum_{i=1}^{C} y_i \log(\hat{y}_i). \quad (10)$$

Step 4: obtaining a joint distribution distance according to the marginal distribution distance and the conditional distribution distance, and combining the joint distribution distance and the label loss to obtain a target function.

Specifically, a dynamic parameter μ is introduced to calculate a relative importance of the marginal distribution distance and the conditional distribution distance to form the joint distribution distance. The joint distribution distance is combined with the predicted label training error of the source domain sample to form a final target function to be optimized. A formula is as follows:

$$loss_{total} = \min_f J(Y_s, f(X_s)) + \lambda JDD(X_s, X_t) = \quad (11)$$

$$\min_f \frac{1}{n_s} \sum_{i=0}^{n_s} J(y_s, f(x_s)) + \lambda((1-\mu)MMD(X_s, X_t) + \mu WCMMD(X_s, X_t)),$$

where $J(\cdot,\cdot)$ denotes a cross-entropy loss function, $\lambda$ is a hyperparameter ($\lambda>0$), and $\mu$ is the dynamic parameter. With the foregoing formula, the network proposed in the training can accurately predict a label of the target domain sample.

The hyperparameter $\lambda$ in the foregoing formula is set as follows:

$$\lambda = \frac{2}{1+e^{\frac{-10^*step}{steps}}} - 1, \quad (12)$$

where steps is a total quantity of times of training, and step is a current training step number.

The dynamic parameter $\mu$ is set as follows:

$$\mu = \frac{MMD(X_s, X_t)}{MMD(X_s, X_t) + WCMMD(X_s, X_t)}, \quad (13)$$

where $MMD(X_s, X_t)$ and $WCMMD(X_s, X_t)$ respectively denote the marginal distribution distance and the conditional distribution distance between the source domain sample and the target domain sample.

Step 5: optimizing the target function by using SGD, and training the deep convolutional neural network model to obtain an optimized deep convolutional neural network model.

Specifically, a high-level feature alignment target function is minimized by using SGD, to update parameters of the model, thereby training the model.

$$\theta_i < ?\theta_i/\alpha \frac{\partial}{\partial \theta_i} l^*\pounds +, \quad (14)$$

where $\theta$ denotes all parameters in the model, $\theta_i$ denotes an $i^{th}$ parameter, $l(\theta)$ denotes a target function related to the parameter $\theta$, and $\alpha$ is a learning rate, that is, a step size.

Step 6: inputting the target domain sample into the optimized deep convolutional neural network model to obtain a predicted label of a target domain; and comparing the predicted label of the target domain with an actual label of the target domain to obtain diagnosis accuracy.

Figure 4:
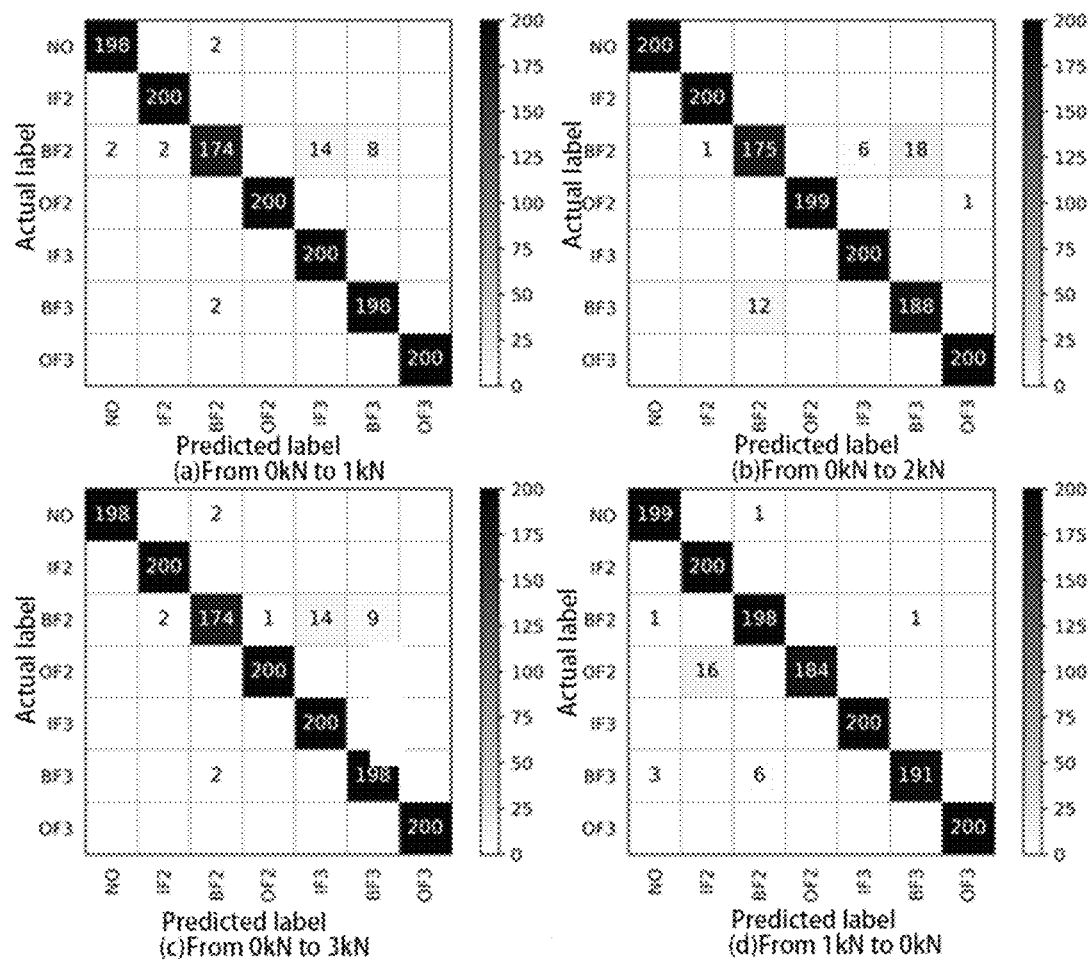
FIG. 4 is a diagram illustrating a diagnostic result in a bearing fault target domain (a test set) according to an embodiment of the present invention.

Specifically, samples without a label in the target domain are fed into the trained dynamic joint distribution alignment network to obtain predicted labels of all target domain samples, and the predicted labels are compared with labels that are manually marked in advance but have not participated in a training process, to obtain the diagnosis accuracy, thereby validating the superiority of the model. A calculation formula of the diagnosis accuracy is as follows:

$$acc = \frac{1}{n_t} \sum_{i=0}^{n_t-1} \text{sign}(F(x_i^t) = y_i^t), \quad (15)$$

where sign( ) denotes an indicator function, $y_i^t$ is an actual label of an $i^{th}$ sample in the target domain, $F(x_i^t)$ is a predicted result of the $i^{th}$ sample in the target domain by the model, and $n_t$ is a total quantity of samples in the target domain. Diagnostic results under four variable working conditions are shown in FIG. 4. As can be seen from the diagnostic results, the average accuracy of diagnosis tasks in the four variable working conditions has reached 98.1% and a recall rate of 0.98. It indicates that by means of the present invention, on the basis that relatively high diagnosis accuracy is obtained, the universality and generality of a deep learning model are greatly improved, and the impact of a domain shift on a conventional deep learning-based fault diagnosis method under variable working conditions can be adequately reduced.

In summary, in the present invention, based on a convolutional neural network and a transfer learning algorithm, a dynamic joint distribution alignment network-based bearing fault diagnosis model is designed. Compared with a conventional deep learning method, the present invention can better mitigate the negative impact of a domain shift on a deep learning model, better meet actual scenarios of industrial applications, and satisfy the demand for fault diagnosis under variable working conditions.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A dynamic joint distribution alignment network-based bearing fault diagnosis method under variable working conditions, comprising steps of:
   S1: acquiring bearing vibration data under different working conditions to obtain a source domain sample and a target domain sample,
   wherein a bearing has different health states under each working condition, bearing vibration data in different health states under each working condition is used as a data domain, and the source domain sample and the target domain sample are selected from the data domain; and the source domain sample is attached with a label, and the label corresponds to a fault type and a fault size;
   S2: establishing a deep convolutional neural network model with dynamic joint distribution alignment, wherein the deep convolutional neural network model comprises a feature extractor and a classifier; and modifying a last layer of neurons of the classifier, to enable a quantity of the last layer of neurons of the classifier to be equal to a quantity of types of labels;
   S3: feeding both the source domain sample and the target domain sample into the deep convolutional neural network model with initialized parameters, and extracting, by the feature extractor, high-level features of the source domain sample and the target domain sample; processing, by the classifier, the high-level features, to generate a predicted label of the source domain sample and a soft pseudo label of the target domain sample, and calculating a label loss between the predicted label of the source domain sample outputted by the classifier and an actual label of the source domain sample; and processing the high-level features of the source domain sample and the target domain sample by using maximum mean discrepancy (MMD) to obtain a marginal distribution distance between the source domain sample and the target domain sample, and processing the high-level features of the source domain sample and the target domain sample, the actual label of the source domain sample, and the soft pseudo label of the target domain sample by using weighted conditional MMD, to obtain a conditional distribution distance between the source domain sample and the target domain sample;

S4: obtaining a joint distribution distance according to the marginal distribution distance and the conditional distribution distance, and combining the joint distribution distance and the label loss to obtain a target function;

S5: optimizing the target function by using stochastic gradient descent (SGD), and training the deep convolutional neural network model to obtain an optimized deep convolutional neural network model; and S6: inputting the target domain sample into the optimized deep convolutional neural network model to obtain a predicted label of a target domain; and comparing the predicted label of the target domain with an actual label of the target domain to obtain diagnosis accuracy.

2. The dynamic joint distribution alignment network-based bearing fault diagnosis method under variable working conditions according to claim 1, wherein S1 comprises:

establishing data sets for different workloads, wherein each data set is named after a workload of the data set, data in different data sets obeys different distributions, and the data set is a source domain or a target domain; and segmenting samples by using N consecutive sampling points as one sample length to make the data set, to obtain the source domain sample and the target domain sample;

wherein the source domain sample is $\mathcal{D}_s = \{(x_i^s, y_i^s)\}_{i=1}^{n_s}$, $y_i^s = \{1, 2, \ldots, C\}$ denotes a source domain formed by samples of C different labels, $x_i^s$ denotes an $i^{th}$ sample in the source domain, $y_i^s$ denotes a label of the $i^{th}$ sample in the source domain, and ns is a total quantity of samples in the source domain;

the target domain sample is $\mathcal{D}_t = \{(x_j^t)\}_{j=1}^{n_t}$, $x_j^t$ denotes a $j^{th}$ sample in the target domain, and $n_t$ is a quantity of all samples in the target domain; data in the source domain is acquired under a probability distribution $P_s$, data in the target domain is acquired under a probability distribution $P_t$, and $P_s \neq P_t$; and the data in the source domain and the data in the target domain obey different distributions.

3. The dynamic joint distribution alignment network-based bearing fault diagnosis method under variable working conditions according to claim 1, wherein S2 comprises:

modifying a structure of ResNet-50 of the deep convolutional neural network model, and modifying a quantity of neurons outputted by the last fully connected layer to be equal to a total quantity of labels.

4. The dynamic joint distribution alignment network-based bearing fault diagnosis method under variable working conditions according to claim 1, wherein between S2 and S3, the method further comprises:

performing fast Fourier transform (FFT) on the source domain sample in a time domain sample to obtain a source domain sample in a frequency domain.

5. The dynamic joint distribution alignment network-based bearing fault diagnosis method under variable working conditions according to claim 1, wherein the classifier in S2 is a softmax classifier.

6. The dynamic joint distribution alignment network-based bearing fault diagnosis method under variable working conditions according to claim 1, wherein the processing the high-level features of the source domain sample and the target domain sample by using MMD to obtain a marginal distribution distance between the source domain sample and the target domain sample in S3 comprises:

the marginal distribution distance $$MMD(X^s, X^t) = \left\| \frac{1}{n_s} \sum_{i=1}^{n_s} \Phi(x_i^s) - \frac{1}{n_t} \sum_{j=1}^{n_f} \Phi(x_j^t) \right\|_H^2 =$$

$$\frac{1}{n_s^2} \sum_{i=1}^{n_s} \sum_{j=1}^{n_s} K(x_i^s, x_j^s) + \frac{1}{n_t^2} \sum_{i=1}^{n_t} \sum_{j=1}^{n_t} K(x_i^t, x_j^t) - \frac{2}{n_s n_t} \sum_{i=1}^{n_s} \sum_{j=1}^{n_t} K(x_i^s, x_j^t),$$

wherein H denotes reproducing kernel Hilbert space, and $\Phi(\bullet)$ denotes a function to which a feature space is mapped; and $K(\bullet,\bullet)$ denotes a Gaussian kernel function, and a formula of the Gaussian kernel function is as follows:

$$K(x_i, x_j) = e^{-\frac{\|x_i - x_j\|^2}{2\sigma^2}},$$

wherein $\sigma$ is a bandwidth, $x_i^s$ denotes an $i^{th}$ sample in the source domain, and $x_j^t$ denotes a $j^{th}$ sample in the target domain.

7. The dynamic joint distribution alignment network-based bearing fault diagnosis method under variable working conditions according to claim 1, wherein the processing the high-level features of the source domain sample and the target domain sample, the actual label of the source domain sample, and the soft pseudo label of the target domain sample by using weighted conditional MMD, to obtain a conditional distribution distance between the source domain sample and the target domain sample in S3 comprises:

a weighted conditional distribution distance:

$$WCMMD(X^s, X^t) =$$

$$\frac{1}{C} \sum_{c=1}^{C} \left\| \sum_{i=1}^{n_s^c} w_i^{sc} \Phi(x_i^{sc}) - \frac{1}{n_t^c} \sum_{j=1}^{n_t^c} w_j^{tc} \Phi(x_j^{tc}) \right\|_H^2 = \frac{1}{C} \sum_{c=1}^{C} \left[ \sum_{i=1}^{n_s^c} \sum_{j=1}^{n_s^c} w_i^{sc} w_j^{sc} K(x_i^{sc}, x_j^{sc}) + \right.$$

$$\left. \sum_{i=1}^{n_t^c} \sum_{j=1}^{n_t^c} w_i^{tc} w_j^{tc} K(x_i^{tc}, x_j^{tc}) - 2 \sum_{i=1}^{n_s^c} \sum_{j=1}^{n_t^c} w_i^{sc} w_j^{tc} K(x_i^{sc}, x_j^{tc}) \right],$$

wherein $w_i^{sc}$ and $w_i^{tc}$ denote weights of corresponding samples, and a calculation formula is as follows:

$$w_i^c = \frac{y_i^c}{\sum_{j=1}^{n} y_j^c},$$

wherein $y_i^c$ is a value at a $c^{th}$ position of a soft label $y_i$ corresponding to an $i^{th}$ sample $x_i$, $x_i^s$ denotes an $i^{th}$ sample in the source domain, and $x_j^t$ denotes a $j^{th}$ sample in the target domain;

for the source domain sample, $y_i$ is a one-hot vector of an actual label of the sample $x_i$; and for the target domain sample, $y_i$ is a probability distribution $\hat{y}_i=f(x_i)$ outputted by the classifier, the probability distribution outputted by the classifier is a vector formed by C elements, and each element denotes a probability that a sample belongs to a label.

8. The dynamic joint distribution alignment network-based bearing fault diagnosis method under variable working conditions according to claim 7, wherein the calculating a label loss between the predicted label of the source domain sample outputted by the classifier and an actual label of the source domain sample in S3 comprises:

the label loss:

$$loss_{lobel}(Y_s, f(X_s)) = \frac{1}{n_s}\sum_{j=0}^{n_s} J(y_s, f(x_s)),$$

wherein $J(\cdot,\cdot)$ denotes a cross-entropy loss function, and $$J(y_s, \hat{y}_s) = -\sum_{i=1}^{C} y_i \log(\hat{y}_i).$$

9. The dynamic joint distribution alignment network-based bearing fault diagnosis method under variable working conditions according to claim 7, wherein S4 comprises:

setting a dynamic parameter $\mu$, $$\mu = \frac{MMD(X_s, X_t)}{MMD(X_s, X_t) + WCMMD(X_s, X_t)},$$

wherein $MMD(X_s, X_t)$ and $WCMMD(X_s, X_t)$ respectively denote the marginal distribution distance and the conditional distribution distance between the source domain sample and the target domain sample; and the target function:

$$\begin{aligned} loss_{total} &= \min_f J(Y_s, f(X_s)) + \lambda JDD(X_s, X_t) \\ &= \min_f \frac{1}{n_s}\sum_{i=0}^{n_s} J(y_s, f(x_s)) + \\ &\quad \lambda((1-\mu)MMD(X_s, X_t) + \mu WCMMD(X_s, X_t)) \end{aligned}$$

wherein $J(\cdot,\cdot)$ denotes a cross-entropy loss function, $\lambda$ is a hyperparameter ($\lambda>0$), $$\lambda = \frac{2}{1+e^{\frac{-10*step}{steps}}} - 1,$$

steps is a total quantity of times of training, and step is a current training step number.

10. A computer device, comprising a memory, a processor, and a computer program stored in the memory and configured to be executed by the processor, wherein the processor is configured to execute the program to implement the steps in the method according to claim 1.

\* \* \* \* \*